Jan. 29, 1957  S. B. ELLIS  2,779,897

VOLTAGE REGULATING CIRCUIT

Filed Jan. 17, 1952

INVENTOR.

Samuel B. Ellis

United States Patent Office 2,779,897
Patented Jan. 29, 1957

2,779,897

VOLTAGE REGULATING CIRCUIT

Samuel B. Ellis, Jamaica, N. Y.

Application January 17, 1952, Serial No. 266,954

3 Claims. (Cl. 315—151)

This invention relates to electronic voltage regulating circuits, and more particularly it relates to that class of voltage regulators involving a voltage dropping resistance in series with the load, together with a shunt circuit or electronic bleeder across the load capable of responding to output voltage, and thereby controlling the voltage drop in the series resistor. Such circuits are inherently capable of compensating both for line voltage variations and also for changes in the load.

A particular use of the present invention is that of stabilizing the power delivered to an incandescent lamp, such as a spectrophotometer lamp. Spectrophotometers are notoriously sensitive to lamp temperature and therefore to applied voltage. Furthermore, a typical low voltage lamp (e. g. 6 volts) with a relatively high current (e. g. 4–5 amperes), presents an unusually difficult problem for adequate stabilization. Regulating devices of the saturated core type are useful in spite of wave form distortion, but require additional means for smoothing out the small remaining fluctuations of effective voltage. Various electronic regulators for direct current are inapplicable at such a low voltage and high current drain. However, following the principles of the present invention, a solution of this particular problem may be achieved by application of electronic control to an alternating current source at sufficiently high voltage for effective use of electron tubes, stepping down the resulting regulated voltage by means of a transformer to supply the low voltage required by the spectrophotometer lamp. Rectification of the alternating output is an obvious additional procedure whenever stabilized low-voltage direct current is desired.

The primary object of the present invention is to provide means for regulating and stabilizing the voltage derived from a power source and delivered to a highly sensitive load.

A related object is to provide a regulating circuit which is adaptable as regards its output characteristics so as to serve loads of various types, particularly those requiring low voltage and high current, either alternating or direct.

Another object of the invention is to provide a voltage regulator that is well suited for application to an alternating current source of power.

A further object of the invention is to provide an electronic regulator capable of following after other regulating means, such for example, as a saturated core device, the electronic regulator being required to cooperate efficiently with the first means to smooth out its small residual variations of voltage.

A still further object of the invention is to provide an electronic regulator that may be manually adjusted in such manner as to utilize the full regulating force of the stabilizer within a relatively narrow range of input voltage, selected at will from within wider limits, thereby securing a high degree of voltage stabilization against small fluctuations within any given narrow region, and obviating the need for complete automatic control over the entire range of possible applied voltage.

Other objects and features of the present invention will become apparent upon consideration of the following description taken together with the accompanying schematic drawings, wherein.

Figure 1:
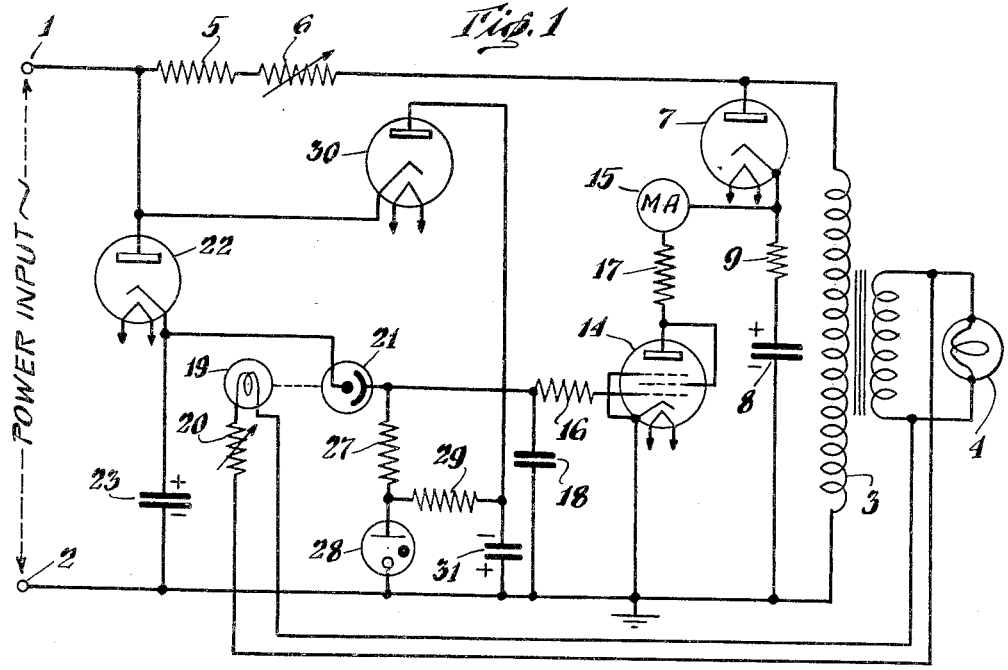
Fig. 1 is a schematic circuit diagram for an alternating current stabilizer illustrating the principles of the invention using a half-wave electronic bleeder with no amplification between phototube and power tube.
Figure 2:
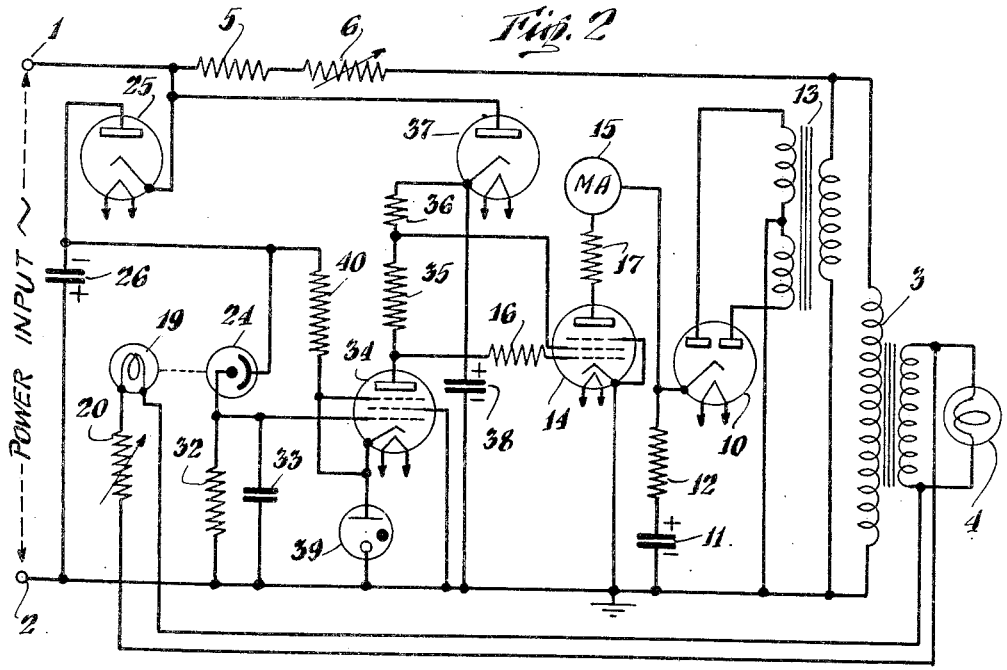
Fig. 2 is a similar schematic diagram for an alternating current stabilizer, containing some of the same parts as Fig. 1, but involving a full-wave electronic bleeder and one stage of amplification between phototube and power tube.

In both Figs. 1 and 2, the alternating current to be stabilized is fed into terminals 1 and 2, from which it passes through the voltage dropping resistor 5 plus 6 in series with the load, represented by transformer 3 feeding the low voltage lamp 4. Shunted across the load is a rectifying system which, in Fig. 1, includes the half-wave rectifier 7 together with its associated condenser 8 and current limiting resistor 9. The rectifying system in Fig. 2 includes a full-wave rectifier 10 with associated condenser 11, current limiting resistor 12, and transformer 13 supplying power to the rectifier tube from a center tapped secondary while its primary is shunted across the load.

Fed by the rectifying system in both cases, is a grid controlled electron tube 14, such for example as a beam power tube, connected as a triode in Fig. 1, and connected as a pentode in Fig. 2. Tube 14 will be referred to as the "control tube." Its plate current is indicated by the milliammeter 15 which shows the working state of the electronic bleeder. Grid resistor 16 and plate resistor 17 are sometimes useful in preventing parasitic oscillations, and by-pass condenser 18 in Fig. 1 may also be added for its stabilizing influence on the vacuum tube circuit. The electronic bleeder current, shunted across the load, is essentially the plate current of the control tube 14, and is therefore subject to regulation by the grid of tube 14. The remaining components of the circuit feed this grid, making it respond in a sensitive manner to any changes in the output voltage of the power unit.

Figs. 1 and 2 both show an incandescent lamp 19 in series with a manually adjustable rheostat 20 and receiving energy from the output of the power unit. The light from lamp 19 falls upon the cathode of a phototube, 21 in Fig. 1, or 24 in Fig. 2, and the resultant current transmitted by the phototube is effective in controlling, through suitable coupling means, the voltage on the grid of tube 14. In Fig. 1 the voltage for operating the phototube 21 is supplied by the rectifier 22 plus condenser 23; in Fig. 2 the equivalent system comprises rectifier 25 plus condenser 26. In Fig. 1, the cathode of phototube 21 connects directly with the grid resistor of control tube 14, and also with the phototube load resistor 27, the opposite end of which is anchored at a fixed negative potential by means of a voltage regulating gaseous discharge tube 28, fed via the current limiting resistor 29 from rectifier 30 plus condenser 31. In Fig. 2, the anode of phototube 24 connects directly with the grid of amplifier tube 34, and also with the phototube load resistor 32, which terminates at ground and is by-passed by condenser 33. The amplifier tube 34, connected as shown in Fig. 2, involves the following associated components: plate load resistor 35 plus 36; plate voltage supply from rectifier 37 plus condenser 38; voltage regulating gaseous discharge tube 39 between cathode and ground, tube 39 being supplied through current limiting resistor 40 leading from the previously mentioned rectifier system 25 plus 26. The plate of amplifier tube 34 is connected to the grid resistor of control tube 14 and thereby regulates the bleeder current. Control tube 14 receives its screen potential from an intermediate point in the plate load resistor of amplifier tube 34. The screen of amplifier tube 34 connects directly with ground, toward which the cathode is maintained suitably negative by the action of voltage regulating tube 39.

The working principles of the stabilized power unit obviously depend upon the electronic bleeder acting jointly with the series resistor 5 plus 6. The total input voltage applied across terminals 1 and 2 is distributed, partly across the series resistor 5 plus 6, and partly across the load (primary coil of transformer 3), the relative proportion across each being influenced by the shunt current flowing through the electronic bleeder (plate current of control tube 14). An increase of bleeder current causes a larger voltage drop in resistor 5 plus 6 with a correspondingly lower voltage appearing across the load, and conversely the output voltage of the power unit increases whenever the bleeder current drops. By making the bleeder current properly responsive to output voltage, the power unit is automatically stabilized. Thus, following the electrical sequence in Fig. 1, it will be noted that a lowered output (voltage across lamp 4) causes less light to be emitted by lamp 19, less phototube current, and a more negative control grid (tube 14), which produces a decrease of bleeder current, and consequently an increased output from the power unit, largely compensating for the initial voltage drop. Following the similar electrical sequence in Fig. 2, a lowered output voltage, with less light from lamp 19 and less phototube current, causes the grid of amplifier tube 34 to swing more positive, transmitting an amplified negative swing to the control grid of tube 14, thereby producing a lowered bleeder current, and consequently an increased output from the power unit, largely compensating for the initial voltage drop. The opposite type of output disturbance, namely an increased instead of a decreased voltage, causes opposite actions in the circuit and leads to the same type of compensating effect. While the output disturbances of greatest present interest originate from fluctuations in voltage of the feeder power line, the above principles explain the fact that stabilization is likewise effective against small changes occurring in the load itself.

A manual adjustment of the actual output voltage over a limited range is accomplished by means of rheostat 6.

An additional manual adjustment, accomplished by rheostat 20, brings the plate current of tube 14 to a reasonable value near the middle of its range as evidenced by milliammeter 15. This is the working position of the electronic bleeder, from which it is capable of exercising a stabilizing control over the circuit for disturbances that are not so large as to throw it "off scale."

It may be noted that in Fig. 1, the electronic bleeder actually drains current from the load line only during each positive half-cycle. In spite of this half-wave characteristic, however, an overall regulating effect is achieved, the light emitted by a lamp being little influenced by wave shape so long as the effective power is under control. Furthermore, the dissymmetry in the alternating current wave tends to be largely smoothed over by the inductance of the load transformer 3. The fact that effective regulation can be achieved by acting on the positive half-cycle alone, is a help in simplifying the circuit when this is desired.

Various possible modifications of the basic circuit will be apparent to those familiar with the general principles involved. Instead of using the resistor 5 plus 6 as the voltage dropping component in an alternating current stabilizer, its equivalent in a different type of impedance, such as an inductance, might conceivably be utilized, especially when the load itself is inductive. In place of a rheostat in series with lamp 19 for maintaining the circuit in a suitable working state, use could be made of an adjustment in the means for coupling the phototube to the control tube. Such adjustment could involve the use of a rheostat or a potentiometer instead of a fixed resistor for loading the phototube. Another substitute for the lamp rheostat would be provision for adjusting the distance between lamp and phototube, or provision for some form of manually adjustable "light valve." The term "light valve" is here used to indicate any shutter, filter, or optical device capable of adjustably blocking or absorbing part of the light. Still another variation in the illustrated circuits is to place an additional stage of vacuum tube amplification between the phototube and the control tube. Without departing from the true spirit of the appended claims, these, and other modifications of the present disclosure may be expected to follow in the natural course of developing the invention and applying it to specific problems.

I claim as my invention:

1. A voltage regulating circuit for stabilizing the energy supplied to a load from an alternating current source characterized by limited voltage variations, comprising a voltage dropping resistor in series with the load, a rectifying system shunted across the load, a grid controlled electron control tube the plate current of which is supplied by said rectifying system thereby producing the equivalent of plate current flowing in parallel with the load and in series with said voltage dropping resistor, an electric lamp supplied by the voltage across the load, a phototube responsive to changes of light emitted by said lamp, and means for coupling said phototube with said grid controlled electron tube in such relationship that increased phototube current causes the grid to become more positive.

2. A voltage regulating circuit as defined by claim 1 in which, said means for coupling the phototube with the control tube includes a phototube load resistor connected to one terminal of the phototube, a voltage regulating tube of the gaseous discharge type connected between said phototube load resistor and ground in such manner that the voltage drop across the regulator tube is of opposing polarity to that existing across the phototube load resistor, and means for coupling with the grid of the control tube that potential occurring at the junction of the phototube and its load resistor.

3. A voltage regulating circuit as defined by claim 1 in which, said means for coupling the phototube with the control tube includes a phototube load resistor connected between the anode of the phototube and ground, a voltage regulating tube of the gaseous discharge type connected between ground and a source of energy at a negative potential with respect to ground, and an amplifier tube with its cathode maintained at a fixed negative potential by connection with the cathode of said regulator tube, said amplifier tube receiving control signals by connection of its grid with the anode of the phototube, while delivering amplified signals by connection of its plate with the grid of the control tube.

References Cited in the file of this patent

UNITED STATES PATENTS

| Number | Name | Date |
|---|---|---|
| 1,273,627 | Langmuir | July 23, 1918 |
| 2,119,374 | Wulff et al. | May 31, 1938 |
| 2,156,886 | Vedder | May 2, 1939 |
| 2,368,582 | Sziklai | Jan. 30, 1945 |
| 2,477,646 | Perlow et al. | Aug. 2, 1949 |